Jan. 4, 1966    R. W. BURTON    3,227,236
SELF-STARTER ARRANGEMENT FOR MOTORCYCLES
Filed June 4, 1962    2 Sheets-Sheet 1
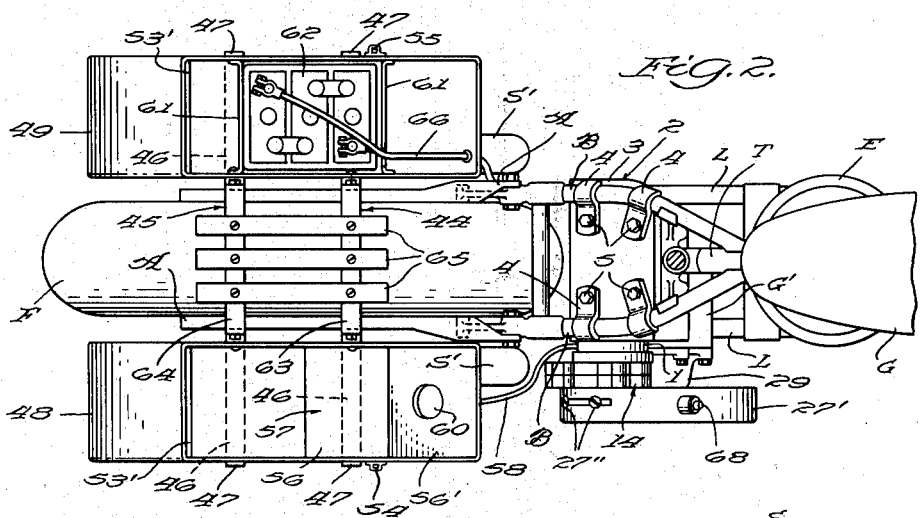
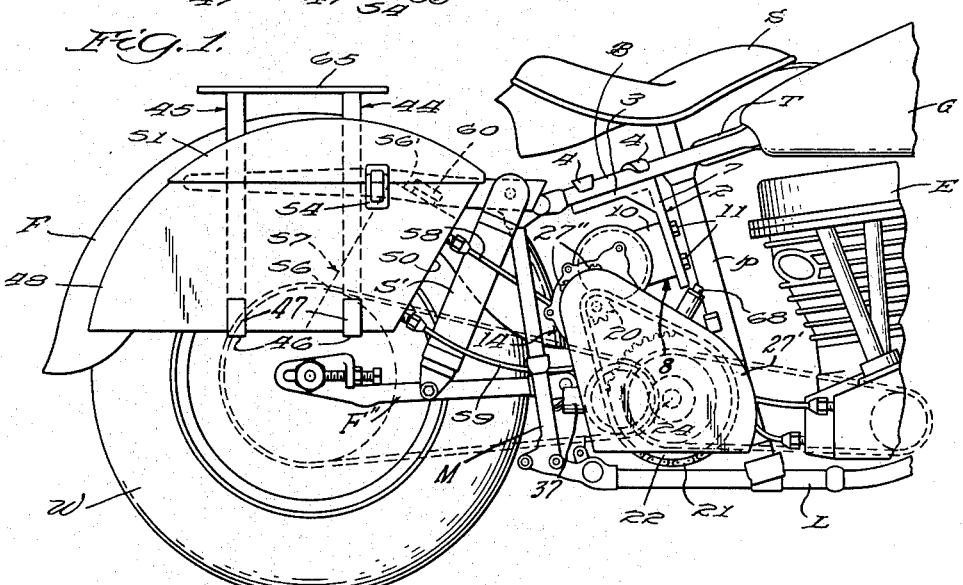
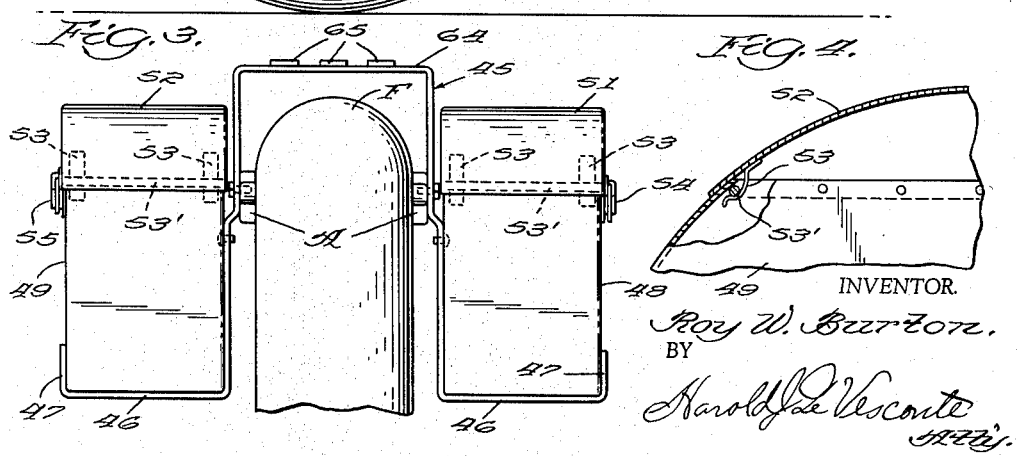
INVENTOR.
Roy W. Burton,
BY
Harold De Visconte
Atty.

Jan. 4, 1966  R. W. BURTON  3,227,236
SELF-STARTER ARRANGEMENT FOR MOTORCYCLES
Filed June 4, 1962  2 Sheets-Sheet 2
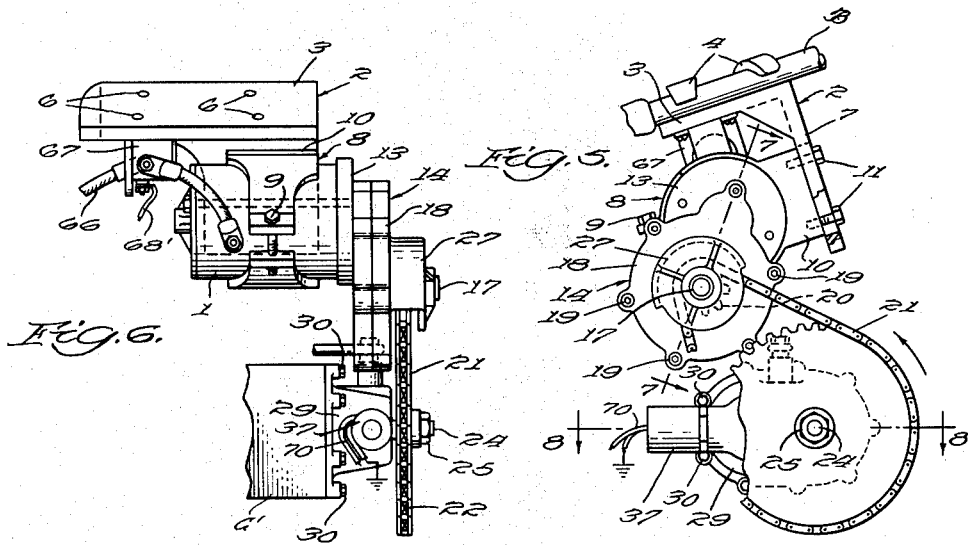
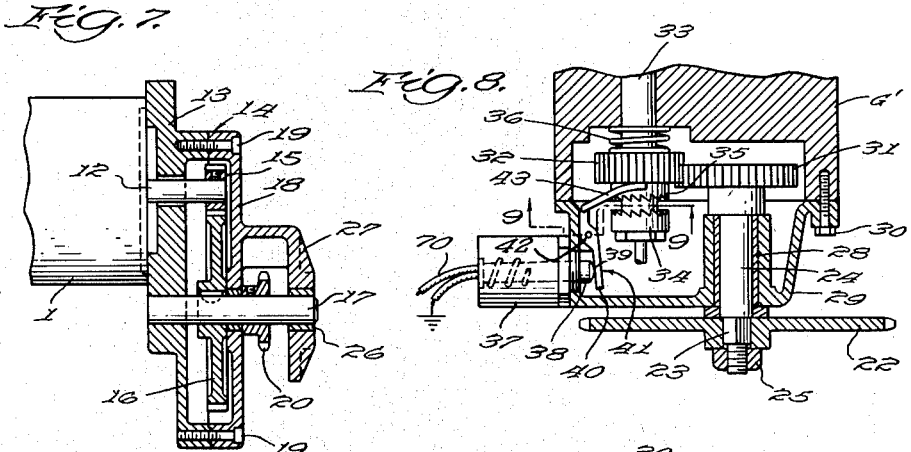
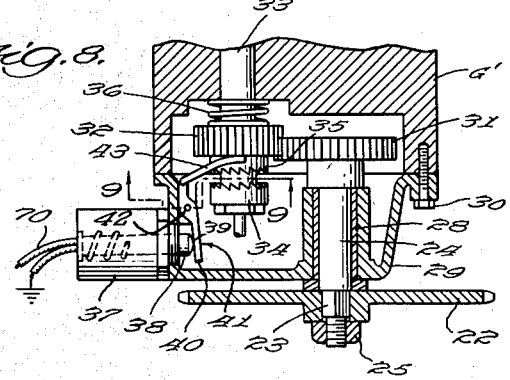
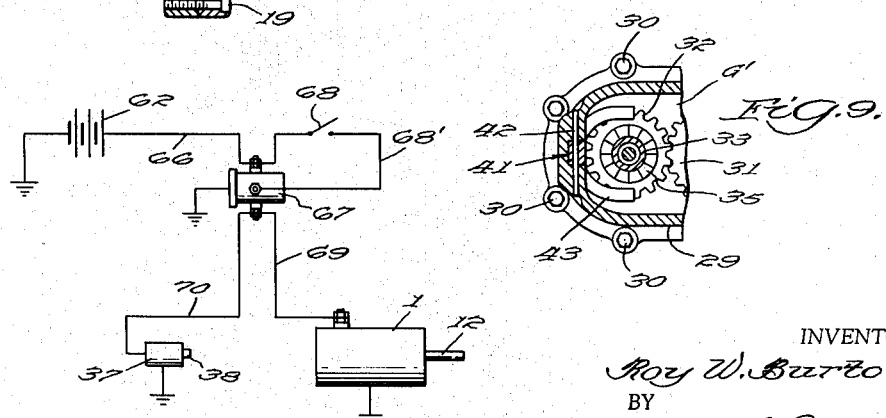
INVENTOR.
Roy W. Burton.
BY
Harold J. LeVesconte
Atty.

United States Patent Office 3,227,236
Patented Jan. 4, 1966

3,227,236
SELF STARTER ARRANGEMENT FOR MOTORCYCLES
Roy W. Burton, La Puente, Calif., assignor to James V. Keith, Glendale, Calif.
Filed June 4, 1962, Ser. No. 199,673
8 Claims. (Cl. 180—33)

This invention relates to self-starters for internal combustion engines and particularly to a form thereof for use in connection with the engines of motorcycles.

An object of the invention is to provide an electric motor self-starter apparatus for a motorcycle.

Another object of the invention is to provide a self-starter apparatus for motorcycle engines which is capable of being installed on existing motorcycles.

Still another object of the invention is to provide a self-starter apparatus for motorcycles which is composed of few parts and simple design and which is so designed as to maintain the weight thereof substantially balanced with respect to the longitudinal center line of the motorcycle.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a side elevational view of the rear portion of a motorcycle showing the apparatus of the present invention installed thereon, FIG. 2 is a top plan view of the motorcycle shown in FIG. 1, the seat broken away to disclose details of structure otherwise concealed, FIG. 3 is an enlarged scale, fragmentary rear elevational view of a portion of the apparatus, FIG. 4 is a fragmentary, side elevational view showing a detail of the locking means for a cover element of the apparatus, FIG. 5 is a fragmentary side elevation of the apparatus with a drive chain cover removed to show details of mechanism concealed thereby, certain other portions of the mechanism also being broken away for clearness of illustration, FIG. 6 is a fragmentary rear elevational view of the portion of the apparatus shown in FIG. 5, FIG. 7 is an enlarged scale fragmentary sectional view taken on the line 7—7 of FIG. 5, FIG. 8 is an enlarged, fragmentary sectional plan view taken on the line 8—8 of FIG. 5, FIG. 9 is a fragmentary sectional view taken on the staggered line 9—9 of FIG. 8, and FIG. 10 is an electrical circuit diagram of the apparatus.

Referring to the drawings and first to FIGS. 1 and 2, there is shown a motorcycle having a frame structure including a top frame member T terminating in rearwardly extending bifurcated ends B, B. The frame structure also includes a slightly rearwardly inclined tubular post P on which the seat S is mounted. Extending rearwardly from the ends of the top frame member ends B, B are parallel arms A, A which support the fender F as well as certain portions of the invention to be later described. A pair of vertically extending frame members M connect the lower frame members L, L with the upper frame member ends B, B. Inwardly of the members M, the lower rear end of the frame structure includes a pivotally mounted, rearwardly extending fork F' between the arms of which the rear wheel W is mounted and a pair of compression spring devices S', S' extend diagonally upwardly and forwardly between the sides of the fork F' and the ends B, B to afford yielding support for the rear end of the frame structure and components carried thereby on the wheel W. Additionally, the frame structure carries a gas tank G and an engine E which is connected in driving relation with the wheel W by means including a change speed transmission having a gear box G' mounted in rear of the engine on the lower members L, L of the frame structure. Heretofore, the space above the transmission gear box G' has been occupied by the oil cooler tank but, as will be later explained, to afford room for the structure of the present invention this component has been moved to another location on the motorcycle.

The present invention comprises an electric motor 1 which is mounted on a bracket 2 having a horizontal component 3 clamped to the under side of the top frame component ends B, B by two pairs of clamps 4 embracing the upper sides of the frame member ends B, B and secured to the bracket component 3 by screws 5 extending through the clamps and threadedly engaging hole 6 in the bracket component 3. The bracket 2 is provided with a depending component 7 disposed rearwardly adjacent the motorcycle frame post component P and the motor 1 is embraced by a clamp ring 8 closed about the motor body by a bolt 9, said clamp ring having a foot portion 10 secured to the bracket component 7 by bolts 11.

The motor shaft 12 extends horizontally transversely of the motorcycle and projects beyond the end of the motor and through the side member 13 of a gear housing 14 which is fixed to the end of the motor frame. Within the housing 14 the shaft 12 carries a pinion 15 fixed thereto which meshes with a spur gear 16 fixed to a shaft 17 which is journaled at one end in the gear housing member 13 and having the other end extending through and journaled in the other member 18 of the gear housing 14; said gear housing members being joined by a series of screws 19 around the periphery thereof to enclose the pinion and spur gear. Exteriorly of the housing member 18, the shaft 17 carries a sprocket 20 which is connected by a chain 21 to a larger sprocket 22 fixed on the squared end 23 of a shaft 24 by a nut 25. Outwardly beyond the sprocket 20, the shaft 17 terminates in a bearing 26 in the side wall of a shroud 27 formed integrally with the outer member 18 of the gear box, said shroud covering the sprocket 20 and serving as a mounting means for a cover 27' fixed to the outer surface of said shroud by any suitable means as, for example, by screws 27'', said cover serving to guard the outer end face of the sprocket 22 and the reaches of the chain between the two sprockets. The shaft 24 is journaled in a bearing 28 in a cover plate member 29 secured to the end of the transmission gear box G' by screws 30 and within the cavity formed by the cover plate member 29, the shaft 24 carries a spur gear 31 fixed thereto which meshes with the spur gear 32 freely mounted on a shaft 33 of the motorcycle change speed transmission mechanism.

At its outer end, the shaft 33 carries a sawtooth jaw clutch member 34 fixed thereto and the end of the gear 32 facing the jaw clutch member 34 is provided with a complementary jaw clutch member 35. A compression spring 36 surrounding the shaft 33 and reacting between the opposing faces of the transmission gear box G' and the gear 32 tends constantly to move the gear 32 outwardly along the shafts to effect interengagement of the jaw clutch members.

Mounted on a wall of the cover plate member 29 is a solenoid comprising the coil 37 and a spring biased armature 38 which, within the cavity formed by the cover plate 29, is provided with a rounded end 39 which engages an arm 40 of a bell crank member 41 which is mounted on a pivot pin 42 carried by the inner face of the cover plate member 29. The other end 43 of the bell crank member is bifurcated to straddle the jaw clutch portion 35 of the gear 32 and the spring bias on the armature 38 of the solenoid is sufficient to overcome the bias of the spring 36 and thus, in the absence of energizing of the armature coil is able to cause the bell crank member to hold the jaw clutch members disengaged by moving the gear 32 toward the end of the gear box G'.

Fixed to the outer faces of the fender supporting arms A, A are forward and rearward, inverted U-shaped flat metal members 44 and 45 which extend downwardly nearly to the horizontal plane containing the axial line of the wheel W and which thence extend in outward horizontal runs 46 terminating in upturned ends 47 to form pairs of stirrups on which the metal saddle bag type boxes 48 and 49 are mounted; said boxes being curved on their upper surface generally conforming to the curvature of the fender as viewed in side elevation and having a flat, horizontal bottom resting on the stirrups and a front end surface 50 extending diagonally upwardly and forwardly. Said boxes are provided with removable covers 51 and 52 secured thereon by any suitable means such as spring latches 53, 53 thereof engaging transverse rods 53' (see FIG. 4) at the rear ends of the covers and by securing means 54 and 55 adjacent the front ends thereof.

The forward end of the box 48 is provided with a partition 56 which is parallel to the front end 50 thereof and with a top portion 56' which transforms that end of the box into a tank 57 for cooling the lubricating oil; said tank replacing the tank customarily positioned in the space occupied by the starting motor and the power transmitting gearing associated therewith. Tubes 58 and 59 connect the tank with the engine E for oil circulation and a filler cap 60 in the top portion of the partition 56' affords access for replenishment of oil. The box 49 is provided with spaced, transverse partitions 61, 61 forming a box for reception of a storage battery 62. The upper flat runs 63 and 64 of the members 44 and 45 are interconnected by longitudinally extending bars 65 to form a luggage carrying platform.

The battery 62 is connected by a lead 66 to one side of a relay switch 67 which is controlled by the normally open pushbutton switch 68 which, in the illustrated embodiment of the invention, is mounted on the upwardly and rearwardly sloping top surface of the chain cover 27' and is interposed in a lead 68' between the battery and the operating coil of the relay switch 67. A second lead 69 connects the other side of the relay switch 67 to the motor 1 and a third lead 70 connects the said other side of the relay switch 67 to the solenoid coil 37.

When it is desired to actuate the starter, the starter button switch 68 is depressed and this energizes the coil of the relay switch 67 causing that switch to connect the battery with the starting motor 1 and at the same time energizes the solenoid coil 37 with resultant retraction of the armature 38 thereof allowing the spring 36 to move the gear 32 toward the jaw clutch member 37 and to cause the teeth of the two jaw clutch members to interengage.

Referring to FIG. 5 it will be noted that the large sprocket 22 is rotated in a counterclockwise direction. This, in turn, causes the gear 31 to move in a counterclockwise direction, wherefore, the gear 32 will be moving in a clockwise direction. In FIG. 8 it will be noted that the direction of the sloped and the straight faces of the clutch teeth are such as to engage under that direction of rotation. Since the jaw clutch member 34 is fixed to the shaft 33 which in turn is operatively connected to the engine crank shaft through the normal transmission connection of the motorcycle to the engine, it will be cranked and when it is started, the manual pressure on the starter switch is released stopping the motor and disengaging the jaw clutch.

While in the foregoing specification there has been disclosed a presently preferred embodiment of the invention, the invention is not to be deemed to be limited to the precise details of construction thus shown by way of example, and it will be understood that the invention includes as well all such changes and modifications in the parts and in the construction, combination and arrangement of parts as shall come within the purview of the appended claims.

I claim:

1. A self-starting arrangement for a motorcycle having a change speed transmission interposed between the engine and the rear wheel; said self-starting arrangement comprising a battery mounted at one side of the motorcycle, an electric motor mounted on the motorcycle frame and electrically conductively connected to said battery, power transmitting means extending between said motor and the motorcycle speed changing transmission including a normally disengaged clutch, control means including a manually closed, normally open switch for connecting said motor to said battery, electromagnetic means connected to said battery and controlled by said switch operative to engage said clutch simultaneously with energization of said motor, and an oil cooling tank for the motorcycle engine disposed at the side of the motorcycle opposite the side thereof at which said battery is located to at least partially compensate for unbalance caused by said battery.

2. A self-starting arrangement for a motorcycle having a change speed transmission interposed between the engine and the rear wheel; said self-starting arrangement comprising a battery mounted at one side of the motorcycle, an electric motor mounted on the motorcycle frame and electrically conductively connected to said battery, power transmitting means extending between said motor and the motorcycle speed changing transmission including a normally disengaged clutch, control means including a manually closed, normally open switch for connecting said motor to said battery, electromagnetic means connected to said battery and controlled by said switch operative to engage said clutch simultaneously with energization of said motor, and a pair of rigid, container components mounted one each at each side of the rear wheel of the motorcycle; said battery being mounted in one of said components, in which a lubricating oil cooling tank is mounted in the other of said components, and in which conduit means extends between said tank and the engine through which circulation of lubricating oil is maintained.

3. A self-starting arrangement for a motorcycle as claimed in claim 2 in which said container components are mounted on a bracket structure fixed to the rear fender supporting means of the motorcycle and in which said bracket structure additionally is constructed to afford a luggage carrying rack means.

4. A self-starting arrangement for a motorcycle having a change speed transmission interposed between the engine and the rear wheel; said self-starting arrangement comprising a battery mounted at one side of the motorcycle, an electric motor mounted on the motorcycle frame and electrically conductively connected to said battery, power transmitting means extending between said motor and the motorcycle speed changing transmission including a normally disengaged clutch, control means including a manually closed, normally open switch for connecting said motor to said battery, electro-magnetic means connected to said battery and controlled by said switch operative to engage said clutch simultaneously with energization of said motor, said power transmitting means being disposed at the side of the motorcycle opposite the side at which said battery is located to at least partially compensate for lateral unbalance caused by said battery, and an oil cooling tank for the motorcycle engine located at the opposite side of the rear wheel of the motorcycle with resultant combining with the weight of said power transmitting means to afford a counterbalance for the weight of said battery.

5. A self-starting arrangement for motorcycle engines comprising a pair of rigid container components mounted on the frame structure of the motorcycle one each at each side of a rear wheel of the motorcycle, a battery contained in one of said components, a cooling tank for engine lubricating oil contained in the other of said components, conduit means connecting said tank to the engine for effecting a path of lubricating oil circulation between the motorcycle engine and said tank, an electric motor mounted on the motorcycle frame structure, electrical conductor means extending between said electric motor and said battery, power transmission means including a two-stage speed reduction means connecting said motor with a gear freely mounted on a shaft operatively connected to the motorcycle engine, a clutch means including one component on said gear and another component on said shaft, a spring means constantly operative to urge said clutch component into interengagement, a spring biased element normally operative to maintain said clutch components disengaged in opposition to said spring means, and electromagnetic means automatically operative simultaneous with said energization of said motor by current from said battery to overcome the spring bias imposed on said spring biased element sufficiently to allow said spring means to effect interengagement of said clutch components.

6. A self-starter arrangement for motorcycle engines as claimed in claim 5 including a manually closed, normally open switch interposed in said electrical conductor means between said battery and said electric motor effective upon being closed to connect said battery to said motor and said electromagnetic means simultaneously effective to overcome the spring bias imposed on said spring biased element sufficiently to allow said spring means to effect engagement of said clutch components.

7. A self-starting arrangement for motorcycle engines as claimed in claim 5 in which said speed reduction means and said oil cooling tank are both mounted at the side of the longitudinal center line of the motorcycle opposite the side at which said battery is disposed with resultant maintenance of lateral balance of the motorcycle.

8. A self-starting arrangement for motorcycle engines as claimed in claim 5 in which said container components are mounted on a bracket structure fixed to the rear fender supporting means of the motorcycle, and in which said bracket structure, additionally, is constructed to afford a luggage carrying rack means.

References Cited by the Examiner
UNITED STATES PATENTS

| | | | |
|---|---|---|---|
| 1,911,414 | 5/1933 | Waseige | 74—7 |
| 2,109,316 | 2/1938 | Harley | 180—35 |
| 2,207,927 | 7/1940 | MacNeil | 123—179 |
| 2,331,976 | 9/1941 | Hare | 180—33 |
| 2,344,983 | 3/1944 | Fageol | 180—54 |
| 2,576,582 | 11/1951 | Elliot | 74—6 |
| 2,636,652 | 4/1953 | Foringer | 224—32 |
| 2,638,175 | 5/1953 | Poulsen | 180—33 |
| 2,783,927 | 3/1957 | Harley | 224—32 |
| 2,947,179 | 8/1960 | Lafitte | 74—6 |

FOREIGN PATENTS 869,817 11/1941 France.

BENJAMIN HERSH, *Primary Examiner.*

PHILIP ARNOLD, A. HARRY LEVY, *Examiners.*